(12) United States Patent
Palmer et al.

(10) Patent No.: US 9,022,663 B2
(45) Date of Patent: May 5, 2015

(54) OIL-LUBRICATED ANTI-FRICTION BEARING

(71) Applicant: Thyssenkrupp Rothe Erde GmbH, Dortmund (DE)

(72) Inventors: Andreas Palmer, Geseke (DE); Jörg Rollmann, Lippstadt (DE)

(73) Assignee: Thyssenkrupp Rothe Erde GmbH

( * ) Notice: Subject to any disclaimer, the term of this patent is extended or adjusted under 35 U.S.C. 154(b) by 0 days.

(21) Appl. No.: 14/045,066

(22) Filed: Oct. 3, 2013

(65) Prior Publication Data

US 2014/0029882 A1 Jan. 30, 2014

Related U.S. Application Data

(63) Continuation of application No. PCT/EP2012/055991, filed on Apr. 2, 2012.

(51) Int. Cl.
| | |
|---|---|
| *F16C 33/66* | (2006.01) |
| *F16C 33/72* | (2006.01) |
| *F16J 15/32* | (2006.01) |
| *F16C 33/78* | (2006.01) |
| *F16C 19/38* | (2006.01) |

(52) U.S. Cl.
CPC ......... *F16C 33/6685* (2013.01); *F16C 2300/14* (2013.01); *F16C 33/6659* (2013.01); *F16C 33/7896* (2013.01); *F16C 19/381* (2013.01); *F16C 2360/31* (2013.01); *F16C 2226/60* (2013.01)

(58) Field of Classification Search
USPC ............ 384/13, 16, 462, 469, 473–475, 477, 384/476; 277/345, 353, 401, 590
See application file for complete search history.

(56) References Cited

U.S. PATENT DOCUMENTS

| | | | | | |
|---|---|---|---|---|---|
| 3,053,542 | A | * | 9/1962 | Haas | 277/549 |
| 3,162,456 | A | * | 12/1964 | Williams | 277/551 |
| 4,093,324 | A | * | 6/1978 | Carrigan | 277/420 |
| 4,402,558 | A | * | 9/1983 | Olschewski et al. | 384/469 |
| 4,575,265 | A | * | 3/1986 | Tooley | 384/474 |
| 4,701,113 | A | * | 10/1987 | Eickmann | 417/472 |
| 4,861,172 | A | * | 8/1989 | Rudolf et al. | 384/16 |
| 4,881,829 | A | * | 11/1989 | Koelsch | 277/408 |
| 5,025,917 | A | * | 6/1991 | Smith et al. | 277/351 |
| 5,028,054 | A | * | 7/1991 | Peach | 277/348 |
| 5,259,628 | A | * | 11/1993 | Nisley | 277/348 |
| 5,558,491 | A | * | 9/1996 | Andrews | 415/111 |
| 2004/0026867 | A1 | | 2/2004 | Adams et al. | |
| 2009/0161997 | A1 | * | 6/2009 | Beauchamp et al. | 384/15 |
| 2010/0247295 | A1 | | 9/2010 | Hofmann | |

FOREIGN PATENT DOCUMENTS

| | | |
|---|---|---|
| DE | 236 146 A1 | 5/1986 |
| DE | 20 2005 007 904 U1 | 8/2005 |

(Continued)

*Primary Examiner* — Marcus Charles
(74) *Attorney, Agent, or Firm* — McNees Wallace & Nurick LLC

(57) ABSTRACT

An oil-lubricated anti-friction bearing is provided for a horizontal arrangement of a rotational axis with a shaft seal that separates a bearing inner chamber, which accommodates rolling bodies, from a bearing outer side, and has a clamping arrangement which acts on the shaft seal from a bearing outer side in order to fix the shaft seal axially. The clamping arrangement has an outlet for oil.

13 Claims, 3 Drawing Sheets

(56) References Cited

FOREIGN PATENT DOCUMENTS

| DE | 10 2007 049 087 A1 | 4/2009 |
| DE | 10 2008 009 740 A1 | 8/2009 |
| EP | 2088232 A1 * | 8/2009 | ............ F02F 11/007 |
| WO | 2010/040027 A2 | 4/2010 |

* cited by examiner

OIL-LUBRICATED ANTI-FRICTION BEARING

CROSS REFERENCE TO RELATED APPLICATIONS

This application is a Continuation of International Application No. PCT/EP2012/055991, filed on Apr. 2, 2012, entitled OIL-LUBRICATED ANTI-FRICTION BEARING, which application is hereby incorporated by reference in its entirety.

BACKGROUND

The invention relates to an oil-lubricated anti-friction bearing for a horizontal arrangement of the rotational axis having a shaft seal which separates a bearing inner space, which receives a rolling body, from a bearing outer side, and having a clamping arrangement which acts on the shaft seal from the bearing outer side in order to fix the shaft seal axially. The anti-friction bearing can be configured, in particular, as a large anti-friction bearing which can be used, for example, in wind power plants for mounting the rotor.

The anti-friction bearing comprises an inner ring and an outer ring and rolling bodies which are arranged between them. The manner and arrangement of the rolling bodies is not restricted here within the scope of the invention. The anti-friction bearing can preferably be loaded radially and axially, to which end, for example, tapered rollers which are arranged obliquely with respect to the rotational axis can be provided (DE 10 2007 049 087 A1). The anti-friction bearing can also be configured as an axial/radial anti-friction bearing with separate bearing rows for the axial bearing firstly and the radial bearing secondly. A corresponding anti-friction bearing is known from DE 10 2008 009 740 A1.

Anti-friction bearings having the features which are described at the outset are known from DE 20 2005 007 904 U1 and DE 10 2007 049 087 A1. In order to seal the inner space, loaded with oil, of the bearing against oil escaping, axially clamped shaft seals are provided in the form of simple shaft sealing rings. In order to improve the sealing action, according to DE 10 2007 049 087 A1, two shaft sealing rings which are loaded in each case with a clamping ring are provided one behind another on each end side of the anti-friction bearing. Nevertheless, a certain discharge of oil during long-term operation cannot be prevented. A considerable leak which leads to contamination of the surroundings of the oil-lubricated anti-friction bearing can occur, in particular, in the case of high oil filling levels, insufficient ventilation or damage to the shaft sealing ring.

In anti-friction bearings, it is known to fill said anti-friction bearings only once with oil or else to load them or to flush them with fresh oil during operation. A corresponding anti-friction bearing is known from DD 236 146 A1. Independently of the two options for lubrication, however, there is the problem that the surroundings of the anti-friction bearing are contaminated by escaping oil.

Against this background, the invention is based on the object of avoiding contamination by escaping oil in an oil-lubricated anti-friction bearing.

SUMMARY

Proceeding from an oil-lubricated anti-friction bearing having the features which are described at the outset, the object is achieved according to the invention by virtue of the fact that the clamping arrangement has an outflow for oil. In the case of the horizontal arrangement of the rotational axis of the anti-friction bearing, the outflow for oil is arranged in a lower region, with the result that oil which, starting from the bearing inner space, has overcome the shaft seal passes to the outflow solely as a result of gravity.

Accordingly, the anti-friction bearing has to be mounted in a positionally correct manner, to which end a corresponding marking can be attached, for example, on the upper side or the underside of the anti-friction bearing. In order to conduct the oil to the outflow solely on the basis of gravity, the rotational axis is preferably horizontal in the mounted state. However, a certain amount of tilting with respect to the horizontal is possible, as long as the described discharge of the oil to the outflow is ensured.

The shaft seal can be configured as a simple shaft sealing ring which usually has a carrier ring and a sealing lip which bears against the shaft and/or an inner ring of the bearing. In the context of the invention, contamination of the bearing outer side by the discharge of oil through the outflow can be avoided even without a structurally complicated embodiment of the shaft sealing ring.

In order to ensure a controlled discharge of oil through the outflow, the clamping arrangement preferably has an oil collecting space which is adjoined by the outflow. The oil collecting space is provided to collect the oil which, starting from the bearing inner space, has overcome the shaft seal, and to conduct it to the outflow.

According to one preferred embodiment of the invention, it is provided that the clamping arrangement is formed by a clamping ring and clamping screws, the clamping screws usually pulling the clamping ring against a bearing outer ring and therefore clamping the shaft seal in the axial direction. Here, as oil collecting space, the clamping ring can have a drainage groove which adjoins the shaft seal on the inside and, starting from the outflow for oil, extends at least around part of the inner circumference of the clamping ring. Since oil which escapes from the bearing inner space can flow readily to the outflow solely on account of gravity on the clamping arrangement, a complicated sealing means to the outside is not required. Accordingly, the clamping ring can also be divided into clamping ring segments in the circumferential direction; however, the joints should lie outside the region, in which the outflow is provided. The segmented clamping ring can also be handled, mounted and dismantled readily in constricted conditions. This is advantageous precisely in the case of use in a large anti-friction bearing, for example in the case of a wind power plant. Finally, the weight during the handling of individual segments is also reduced considerably, which is particularly advantageous precisely in the case of difficult mounting conditions.

According to the invention, oil which passes the shaft seal is collected and is discharged through the outflow, with the result that a contamination of the bearing outer sides, that is to say of the end faces of the anti-friction bearing, is avoided.

Various possibilities result within the context of the invention for handling leakage oil of this type. For instance, it is possible to discharge the leakage oil in a controlled manner, to conduct it into a store or external oil tank or else to guide it back into the bearing inner space, to which end a transport apparatus in the form of a pump and corresponding feed lines are then to be provided.

A return of the escaped oil is possible in a particularly simple way precisely when the anti-friction bearing has oil channels which open directly into the bearing inner space and are usually formed in the bearing outer ring, independently of the outflow of the clamping arrangement. Oil channels of this type are frequently used in practice, in order to regularly refill oil or to flush the anti-friction bearing with oil. In an embodiment of this type, optimum lubrication of the anti-friction bearing can be ensured, a certain replacement of the oil also being possible. If oil is guided in a circuit, it can also be replaced if required or at least cleaned by way of filters or the like.

In order to conduct leakage oil away from the clamping arrangement, an opening of the outflow can be provided directly in the clamping arrangement, that is to say preferably the clamping ring, on the bearing outer side. For example, a discharge hose or the like can be connected to said opening. According to one alternative embodiment of the invention, the outflow of the clamping arrangement is connected to a discharge channel which is formed in the outer ring of the anti-friction bearing. The oil which is discharged can then be guided away through the outer ring and, in particular, also guided to an end side of the outer ring.

A shaft seal and a clamping arrangement with an outflow for oil are preferably provided on both bearing outer sides.

Since leakage oil is guided away through the outflow, a contamination on the bearing outer side can be avoided even without complicated sealing measures. A certain sealing action between the inner region of the clamping arrangement, in which inner region the outflow is arranged, and the bearing outer side is expedient, however, in order to avoid the passage of contaminants, for example dust particles. In particular, at least one dust protection seal can be provided which interacts with the clamping arrangement and separates the outflow from the bearing outer side. According to one particularly preferred development, the clamping arrangement has a radially circumferential web, a dust protection seal being provided on both sides of the web as viewed in the axial direction. The intermediate space between the web and the two dust protection seals can also be filled with a grease.

BRIEF DESCRIPTION OF THE FIGURES

In the following text, the invention will be explained using the drawing which illustrates merely one exemplary embodiment and in which.

DETAILED DESCRIPTION

Figure 1:
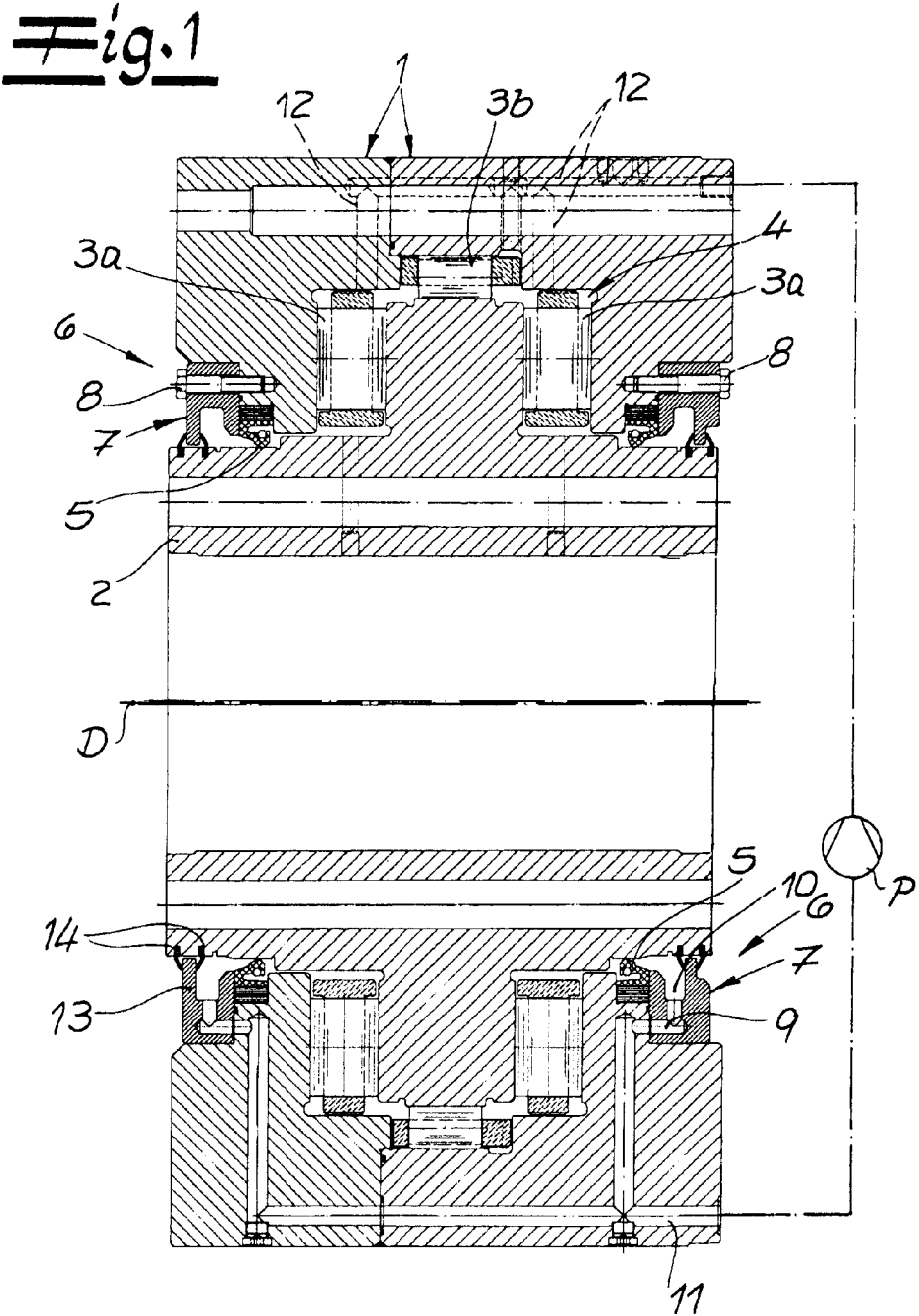
FIG. 1 shows an anti-friction bearing according to the invention.
Figure 2A:
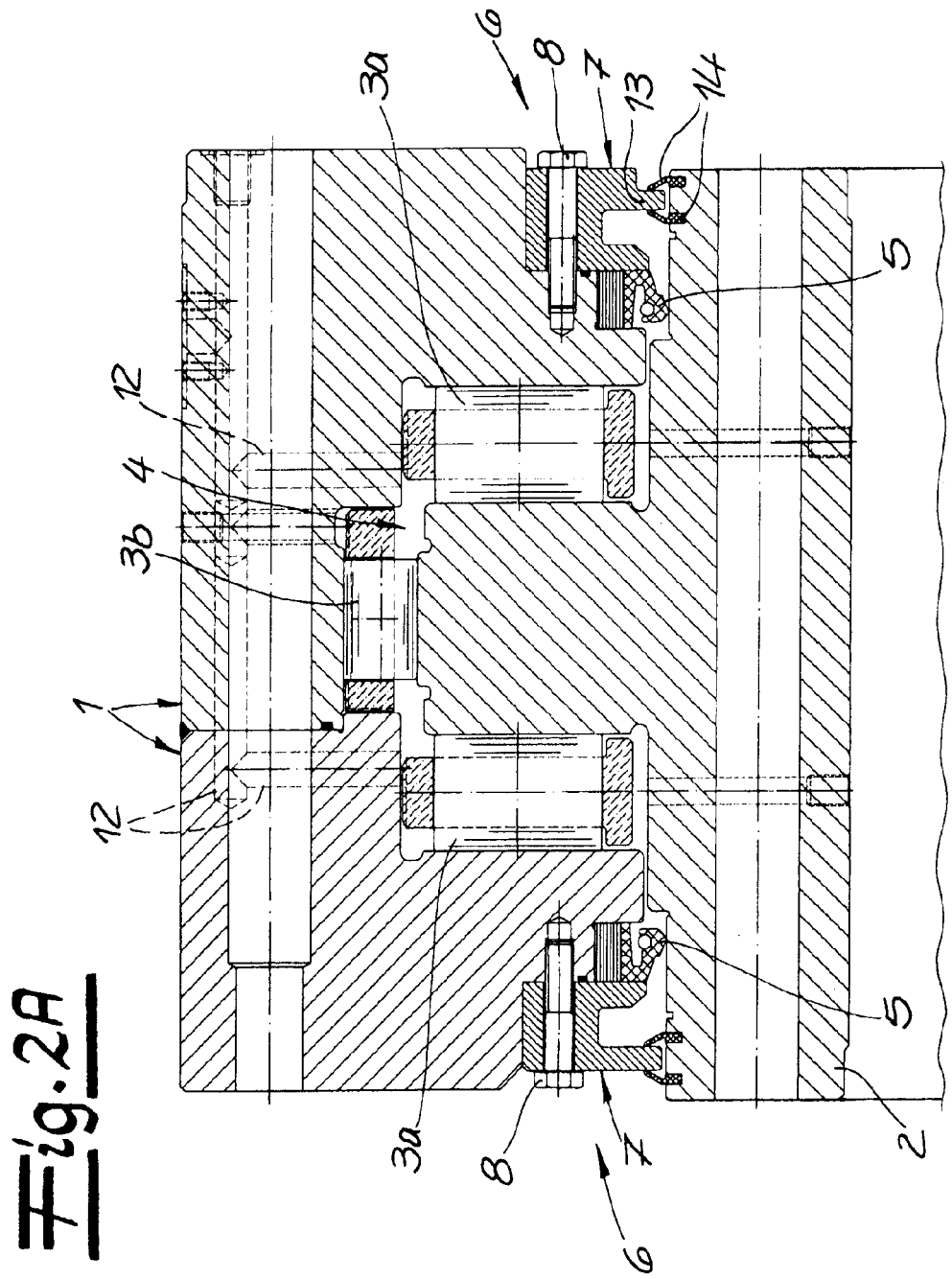
FIG. 2a shows the upper region of the anti-friction bearing which is shown in FIG. 1.
Figure 2B:
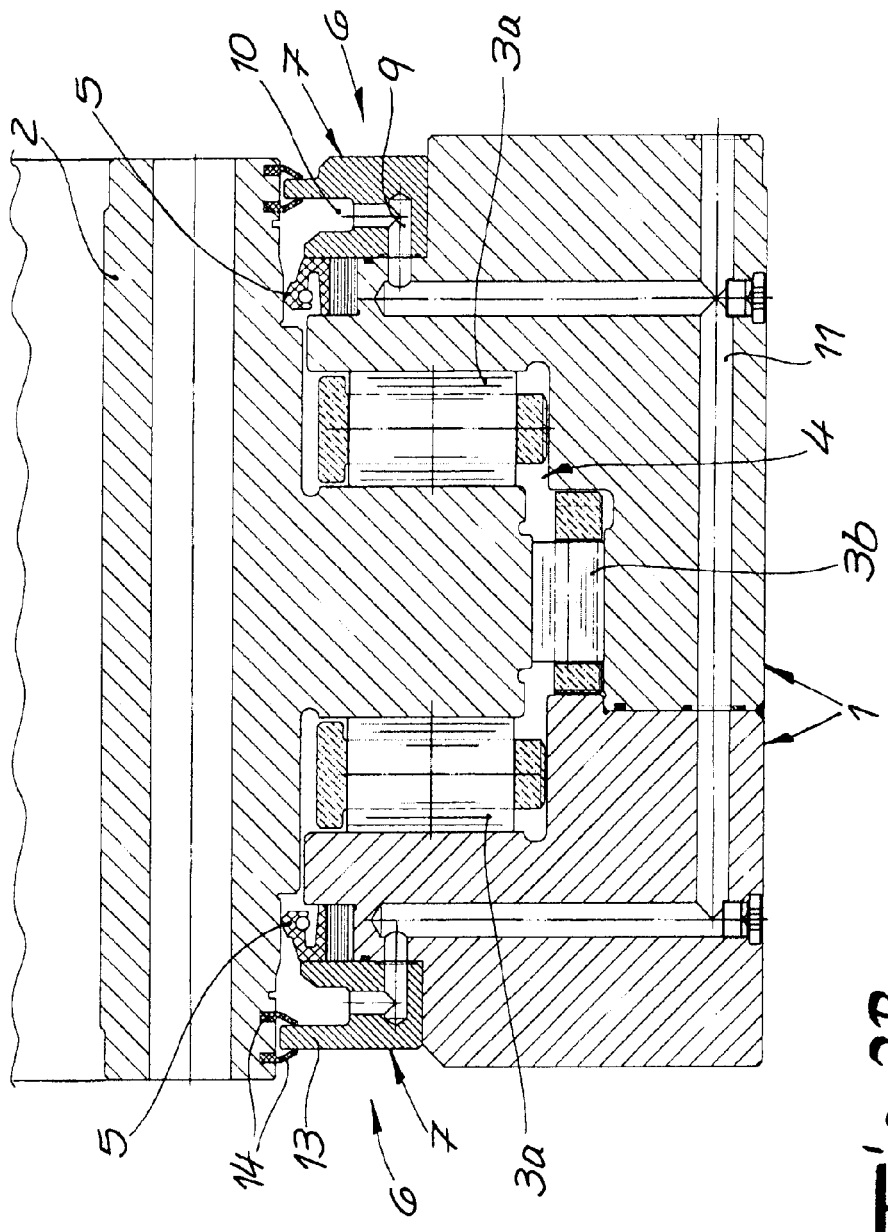
FIG. 2b shows the lower region of the anti-friction bearing which is shown in FIG. 1.

The figures show an oil-lubricated anti-friction bearing which is provided as a large anti-friction bearing for a horizontal arrangement of the rotational axis D. Corresponding large anti-friction bearings with a horizontal rotational axis D are used, for example, as rotor bearings in wind power plants. The anti-friction bearing has a bearing outer ring 1, a bearing inner ring 2 and rolling bodies 3a, 3b which are arranged between them, two bearing rows with rolling bodies 3a for axial support and one bearing row with rolling bodies 3b for radial support being provided by way of example in the exemplary embodiment which is shown. As an alternative, however, other types and arrangements of rolling bodies are also possible, for example an embodiment with tapered rollers.

The rolling bodies 3a, 3b are arranged between the bearing outer ring 1 and the bearing inner ring 2 in a bearing inner space 4 which is separated from the bearing outer side on both sides by an each case one shaft seal in the form of a shaft sealing ring 5. In order for it to be possible to fix the shaft sealing ring 5, clamping arrangements 6 which act in the axial direction and are formed in each case by a clamping ring 7 and clamping screws 8 are provided on the end sides. Even if the shaft sealing rings 5 are provided for separating the bearing inner space 4 from the bearing outer side, the passage of oil cannot be ruled out completely, in particular if the bearing inner space 4 is provided with too much oil or is ventilated insufficiently. High leakage losses can also occur in the case of damage to the shaft sealing ring 5.

In order to avoid contamination at the end sides of the anti-friction bearing by way of escaping oil, according to the invention the clamping ring 7 has an outflow 9 for oil. Here, the anti-friction bearing is to be arranged in such a way that the outflow 9 lies in the lower region, preferably at the lowest point of the clamping ring 7.

In order to conduct oil which has overcome the corresponding shaft sealing ring 5 to the outflow, the clamping ring 7 has a drainage groove 10 which adjoins the shaft sealing ring 5 on the inside and, starting from the outflow 9 for oil, extends around the inner circumference of the clamping ring 7. In order for it to be possible to discharge the collected oil, according to the exemplary embodiment which is shown an outflow channel 11 is formed in the bearing outer ring 1, to which outflow channel 11 the outflow 9 of the clamping ring 7 is connected. The oil is guided through the outflow channel 11 to an end side of the bearing outer ring 1. In the exemplary embodiment, the clamping rings 7 which are provided on both sides of the anti-friction bearing have a common, branched outflow channel 11 in the bearing outer ring 1.

Furthermore, independently of the outflow 9 of the clamping arrangement 6, oil channels 12 are provided which open directly into the bearing inner space 4 and by way of which the bearing inner space 4 can be loaded and also flushed with fresh oil. In an embodiment of this type, it may be suitable, as shown in FIG. 1, to guide leakage of oil from the outflow channel 11 via a pump P back to one of the oil channels 12, through which oil is fed to the bearing inner space 4.

On account of the outflow 9 according to the invention of the clamping arrangement 6, a contamination on the bearing outer sides by way of escaping oil can be avoided using simple means even without a complicated sealing arrangement. Nevertheless, it is expedient to additionally seal the clamping ring 7 at least to a certain extent, to which end, in the exemplary embodiment, the clamping ring 7 has a radially circumferential web 13, a dust protection seal 14 being provided on both sides of the web 13 as viewed in the axial direction. In order to improve the sealing action, the intermediate space between the web 13 and the two dust protection seals 14 can be filled with grease.

Since complicated sealing with respect to the outside is not necessary on the clamping ring 7, the latter can also be divided into segments around the circumference, as a result of which the mounting and handling is simplified considerably, precisely in the case of large anti-friction bearings. Furthermore, the figures show that the bearing outer ring 1 and the bearing inner ring 2 can be provided with holes for fastening them in a customary way.

The invention claimed is:

1. An oil-lubricated anti-friction bearing configured for a substantially horizontal arrangement of a rotational axis, the oil-lubricated anti-friction bearing having a shaft seal which separates a bearing inner space, which receives a rolling body, from a bearing outer side, and having a clamping arrangement which acts on the shaft seal from the bearing outer side in order to fix the shaft seal axially, characterized in that the clamping arrangement has an outflow for oil.

2. The oil-lubricated anti-friction bearing as claimed in claim 1, characterized in that the shaft seal is a shaft sealing ring.

3. The oil-lubricated anti-friction bearing as claimed in claim 1, characterized in that the clamping arrangement has an oil collecting space which is adjoined by the outflow.

4. The oil-lubricated anti-friction bearing as claimed in claim 1, characterized in that the clamping arrangement is formed by a clamping ring and clamping screws.

5. The oil-lubricated anti-friction bearing as claimed in claim 4, characterized in that the clamping ring has a drainage groove which adjoins the shaft seal on the inside and, starting from the outflow for oil, extends at least around part of the inner circumference of the clamping ring.

6. The oil-lubricated anti-friction bearing as claimed in claim 4, characterized in that the clamping ring is divided into clamping ring segments as viewed in the circumferential direction.

7. The oil-lubricated anti-friction bearing as claimed in claim 1, characterized in that the outflow of the clamping arrangement is connected to an outflow channel which is formed in a bearing outer ring of the anti-friction bearing.

8. The oil-lubricated anti-friction bearing as claimed in claim 7, characterized in that the outflow channel opens on an end side of the bearing outer ring.

9. The oil-lubricated anti-friction bearing as claimed in claim 1, characterized in that a transport apparatus is provided, in order to conduct the oil which collects on the outflow back into the bearing inner space.

10. The oil-lubricated anti-friction bearing as claimed in claim 1, characterized in that oil channels which open directly into the bearing inner space are provided independently of the outflow of the clamping arrangement.

11. The oil-lubricated anti-friction bearing as claimed in claim 1, characterized in that a shaft seal and a clamping arrangement with an outflow for oil are provided in each case on both bearing outer sides.

12. The oil-lubricated anti-friction bearing as claimed in claim 1, characterized in that at least one dust protection seal is provided which interacts with the clamping arrangement and separates the outflow from the bearing outer side.

13. The oil-lubricated anti-friction bearing as claimed in claim 12, characterized in that the clamping arrangement has a radially circumferential web, a dust protection seal being provided on both sides of the web as viewed in the axial direction.

\* \* \* \* \*